(12) United States Patent
Jasiuk et al.

(10) Patent No.: US 11,557,308 B2
(45) Date of Patent: Jan. 17, 2023

(54) METHOD AND APPARATUS FOR ESTIMATING VARIABILITY OF BACKGROUND NOISE FOR NOISE SUPPRESSION

(71) Applicant: Google Technology Holdings LLC, Mountain View, CA (US)

(72) Inventors: Mark A. Jasiuk, Chicago, IL (US); Tenkasi V. Ramabadran, Oswego, IL (US)

(73) Assignee: Google LLC, Mountain View, CA (US)

( * ) Notice: Subject to any disclaimer, the term of this patent is extended or adjusted under 35 U.S.C. 154(b) by 115 days.

(21) Appl. No.: 17/129,905

(22) Filed: Dec. 21, 2020

(65) Prior Publication Data

US 2021/0110839 A1 Apr. 15, 2021

Related U.S. Application Data

(63) Continuation of application No. 15/684,013, filed on Aug. 23, 2017, now Pat. No. 10,896,685, which is a
(Continued)

(51) Int. Cl.
*H04B 15/00* (2006.01)
*G10L 21/0216* (2013.01)
(Continued)

(52) U.S. Cl.
CPC .......... *G10L 21/0216* (2013.01); *G10L 15/20* (2013.01); *G10L 21/0208* (2013.01)

(58) Field of Classification Search
CPC . G10L 21/0216; G10L 21/0208; G10L 25/84; G10L 15/20; G10L 2025/783;
(Continued)

(56) References Cited

U.S. PATENT DOCUMENTS

| 4,409,435 | A | 10/1983 | Ono |
| 6,035,408 | A | 3/2000 | Huang |

(Continued)

FOREIGN PATENT DOCUMENTS

| CN | 1369846 A | 9/2002 |
| CN | 101517550 A | 8/2009 |

(Continued)

OTHER PUBLICATIONS

European Office Action, Application No. 14725344.7 dated Nov. 12, 2020, 6 pages.
(Continued)

*Primary Examiner* — Kharye Pope
(74) *Attorney, Agent, or Firm* — Honigman LLP; Brett A. Krueger

(57) ABSTRACT

An electronic device measures noise variability of background noise present in a sampled audio signal, and determines whether the measured noise variability is higher than a high threshold value or lower than a low threshold value. If the noise variability is determined to be higher than the high threshold value, the device categorizes the background noise as having a high degree of variability. If the noise variability is determined to be lower than the low threshold value, the device categorizes the background noise as having a low degree of variability. The high and low threshold values are between a high boundary point and a low boundary point. The high boundary point is based on an analysis of files including noises that exhibit a high degree of variability, and the low boundary point is based on an analysis of files including noises that exhibit a low degree of variability.

20 Claims, 8 Drawing Sheets

Related U.S. Application Data continuation of application No. 13/950,980, filed on Jul. 25, 2013, now abandoned.

(60) Provisional application No. 61/827,030, filed on May 24, 2013, provisional application No. 61/798,097, filed on Mar. 15, 2013, provisional application No. 61/776,793, filed on Mar. 12, 2013.

(51) Int. Cl.
*G10L 15/20* (2006.01)
*G10L 21/0208* (2013.01)
*G10L 21/00* (2013.01)

(58) Field of Classification Search
CPC .......... G10L 21/034; G10L 25/60; G10L 2021/02165; G10L 21/02; G10L 21/023; G10L 21/0264; H04R 2410/01; H04R 2460/01; H04R 25/407; H04R 1/326; H04R 3/005; H04R 1/1083; H04R 2225/43; H04R 2410/05; H04R 2430/01; H04R 2430/20; H04R 25/356; H04M 2250/02; H04M 9/082; H04M 1/6091; H04M 1/6075; H04M 2250/12; G10K 11/178; G10K 2210/1081; G10K 11/17853; G10K 2210/3028; G10K 11/17873; G10K 11/17823; G10K 2210/3016; G10K 2210/3026; G10K 11/17837; G10K 11/17875; G10K 11/17879; G10K 2210/3025; G10K 2210/3027; G10K 2210/30391; G10K 11/175; G10K 11/17854; G10K 11/17881; G10K 2210/3014; G10K 2210/1282; G10K 2210/3056; G10K 2210/12821; G10K 2210/3033; G10K 2210/30351
USPC ............... 381/92, 104, 94.1, 122, 312, 317; 700/94; 704/226, 21.002, 233
See application file for complete search history.

(56) References Cited

U.S. PATENT DOCUMENTS

| | | |
|---|---|---|
| 6,778,959 B1 | 8/2004 | Wu et al. |
| 6,839,670 B1 | 1/2005 | Stammler et al. |
| 6,876,966 B1 | 4/2005 | Deng et al. |
| 6,950,796 B2 | 9/2005 | Ma et al. |
| 6,959,276 B2 | 10/2005 | Droppo et al. |
| 7,124,079 B1 | 10/2006 | Johansson et al. |
| 7,257,532 B2 | 8/2007 | Toyama |
| 7,283,956 B2 | 10/2007 | Ashley et al. |
| 7,392,188 B2 | 6/2008 | Junkawitsch et al. |
| 7,424,426 B2 | 9/2008 | Furui et al. |
| 7,451,085 B2 | 11/2008 | Rose et al. |
| 7,561,700 B1 | 7/2009 | Bernardi et al. |
| 7,941,189 B2 | 5/2011 | Miyauchi |
| 7,996,220 B2 | 8/2011 | Rose et al. |
| 8,175,872 B2 | 5/2012 | Kristjansson et al. |
| 8,219,384 B2 | 7/2012 | Lloyd et al. |
| 8,265,928 B2 | 9/2012 | Kristjansson et al. |
| 8,423,361 B1 * | 4/2013 | Chang ............... G10L 15/32 704/235 |
| 8,428,940 B2 | 4/2013 | Kristjansson et al. |
| 8,682,659 B2 | 3/2014 | Kristjansson et al. |
| 9,183,845 B1 * | 11/2015 | Gopalakrishnan ............ G10L 21/0208 |
| 2003/0177006 A1 | 9/2003 | Ichikawa et al. |
| 2003/0236099 A1 | 12/2003 | Deisher et al. |
| 2004/0029637 A1 | 2/2004 | Hein et al. |
| 2004/0052384 A1 | 3/2004 | Ashley et al. |
| 2004/0138882 A1 | 7/2004 | Miyazawa |
| 2004/0230420 A1 | 11/2004 | Kadambe et al. |
| 2005/0111683 A1 | 5/2005 | Chabries et al. |
| 2005/0187763 A1 | 8/2005 | Arun |
| 2005/0216273 A1 | 9/2005 | Reding et al. |
| 2005/0278172 A1 | 12/2005 | Koishida et al. |
| 2006/0251268 A1 | 11/2006 | Hetherington et al. |
| 2006/0262938 A1 * | 11/2006 | Gauger ................ H03G 7/002 704/E21.002 |
| 2007/0276660 A1 * | 11/2007 | Pinto .................. G10L 21/0208 704/219 |
| 2008/0027723 A1 | 1/2008 | Reding et al. |
| 2008/0091435 A1 | 4/2008 | Strope et al. |
| 2008/0091443 A1 | 4/2008 | Strope et al. |
| 2008/0188271 A1 | 8/2008 | Miyauchi |
| 2008/0189104 A1 | 8/2008 | Zong et al. |
| 2008/0221887 A1 | 9/2008 | Rose et al. |
| 2009/0012783 A1 * | 1/2009 | Klein ................. G10L 21/0208 704/226 |
| 2009/0030687 A1 | 1/2009 | Cerra et al. |
| 2009/0271188 A1 | 10/2009 | Agapi et al. |
| 2009/0271639 A1 * | 10/2009 | Burge ................. G06F 9/4862 713/340 |
| 2009/0274310 A1 | 11/2009 | Taenzer |
| 2009/0290718 A1 | 11/2009 | Kahn et al. |
| 2009/0323982 A1 * | 12/2009 | Solbach .............. G10L 21/0232 381/94.1 |
| 2010/0022283 A1 * | 1/2010 | Terlizzi ............... H04M 1/6058 455/570 |
| 2010/0061564 A1 | 3/2010 | Clemow et al. |
| 2010/0067710 A1 * | 3/2010 | Hendriks ............ G10L 21/0208 381/58 |
| 2010/0150374 A1 | 6/2010 | Bryson et al. |
| 2010/0246849 A1 | 9/2010 | Sudo et al. |
| 2011/0081026 A1 | 4/2011 | Ramakrishnan et al. |
| 2011/0135126 A1 | 6/2011 | Gozen |
| 2011/0137653 A1 | 6/2011 | Ljolje et al. |
| 2011/0302478 A1 * | 12/2011 | Cronie .................. H03M 5/16 375/295 |
| 2012/0004907 A1 | 1/2012 | Kulakcherla et al. |
| 2012/0033827 A1 * | 2/2012 | Murata ............. G10K 11/17875 381/94.1 |
| 2012/0148067 A1 * | 6/2012 | Petersen ............... H04R 3/005 381/92 |
| 2013/0013304 A1 * | 1/2013 | Murthy ............. G10L 21/0208 704/226 |
| 2013/0054231 A1 | 2/2013 | Jeub et al. |
| 2013/0156214 A1 | 6/2013 | Murthy et al. |
| 2013/0218575 A1 | 8/2013 | Konishi et al. |
| 2014/0003635 A1 | 1/2014 | Mohammad et al. |

FOREIGN PATENT DOCUMENTS

| | | |
|---|---|---|
| CN | 103577043 A | 2/2014 |
| EP | 1199708 A2 | 4/2002 |
| WO | 2011149837 A1 | 12/2011 |

OTHER PUBLICATIONS

Ji Ming et al.: "Robust Speaker Recognition in Noisy Conditions", IEEE Transactions on Audio, Speech and Language Processing, IEEE Service Center, Newyork, NY, USA, vol. 15, No. 5, Jul. 1, 2007 (Jul. 1, 2007), pp. 1711-1723, XP011185748, ISSN: 1558-7916, DOI: 10.1109/TASL.2007.899278, 12 pages.

Pei Ding et al.: "Robust mandarin speech recognition in car environments for embedded navigation system", IEEE Transactions on Consumer Electronics, IEEE Service Center, Newyork, NY, US, vol. 54, No. 2, May 1, 2008 (May 1, 2008), pp. 584-590, XP011229939, ISSN: 0098-3063, DOI: 10.1109/TCE.2008.4560134, 7 pages.

Akira Sasou et al.: "Noise Robust Speech Recognition Applied to Voice-Driven Wheelchair", EURASIP Journal On Advances in Signal Processing, vol. 20, No. 3, Jan. 1, 2009 (Jan. 1, 2009), pp. 1-9, XP055132340, ISSN: 1687-6180, DOI: 10.1016/j.specom.2006.03.002, 9 pages.

Gibak Kim et al.: "Improving Speech Intelligibility in Noise Using Environment-Optimized Algorithms", IEEE Transactions on Audio, Speech and Language Processing, IEEE, vol. 18, No. 8, Nov. 1, 2010 (Nov. 1, 2010), pp. 2080-2090, 10 pages.

(56) References Cited

OTHER PUBLICATIONS

Chinese Office Action for the related Application No. 201680048307.6, dated Aug. 5, 2020.
International Search Report and Written Opinion for International Application No. PCT/US2011/029407, dated Jun. 7, 2011, 10 pages.
Bocchieri et al., "Use of geographical meta-data in ASR language and acoustic models", Acoustics Speech and Signal Processing (ICASSP), 2010 IEEE International Conference on IEEE, Mar. 14, 2010, pp. 5118-5121.
International Search Report from related PCT Application No. PCT/US2011/037558, dated Jul. 29, 2011.
International Preliminary Report and Written Opinion from related PCT Application No. PCT/US2011/029407, dated Oct. 26, 2012, 6 pages.
Australian Office Action in Application No. 2011241065, dated Dec. 17, 2013, 3 pages.
Chinese Office Action in Application No. 201180019038.8, dated Dec. 19, 2013, 7 pages (English translation).
International Preliminary Report on Patentability and Written Opinion in International Application No. PCT/US2014/014762, dated Sep. 24, 2015, 7 pages.

* cited by examiner

METHOD AND APPARATUS FOR ESTIMATING VARIABILITY OF BACKGROUND NOISE FOR NOISE SUPPRESSION

CROSS-REFERENCES TO RELATED APPLICATIONS

This U.S. patent application is a continuation of, and claims priority under 35 U.S.C. § 120 from, U.S. patent application Ser. No. 15/684,013, filed on Aug. 23, 2017, which is a continuation of U.S. patent application Ser. No. 13/950,980, filed on Jul. 25, 2013, which claims priority under 35 U.S.C. § 119(e) to U.S. Provisional Application 61/776,793, filed on Mar. 12, 2013, U.S. Provisional Application 61/798,097, filed on Mar. 15, 2013, and U.S. Provisional Application 61/827,030, filed on May 24, 2013. The disclosures of these prior applications are considered part of the disclosure of this application and are hereby incorporated by reference in their entireties.

TECHNICAL FIELD

The present disclosure relates to noise variability estimation and, more particularly, to methods and devices for noise variability estimation for efficient noise suppression and other applications.

BACKGROUND

Although speech recognition has been around for decades, the quality of speech recognition software and hardware has only recently reached a high enough level to appeal to a large number of consumers. One area in which speech recognition has become very popular in recent years is the smartphone and tablet computer industry. Using a speech recognition-enabled device, a consumer can perform such tasks as making phone calls, writing emails, and navigating with GPS using only voice commands.

Speech recognition in such devices is far from perfect, however. A speech recognition engine typically relies on a phoneme database to be able to recognize voice utterances. A user may, however, need to "train" the phoneme database to recognize his or her particular accent, cadence, etc. Even after training, however, the phoneme database may not be accurate in all audio environments. For example, the presence of background noise can decrease speech recognition accuracy.

DRAWINGS

While the appended claims set forth the features of the present techniques with particularity, these techniques may be best understood from the following detailed description taken in conjunction with the accompanying drawings of which:

Figure 1:
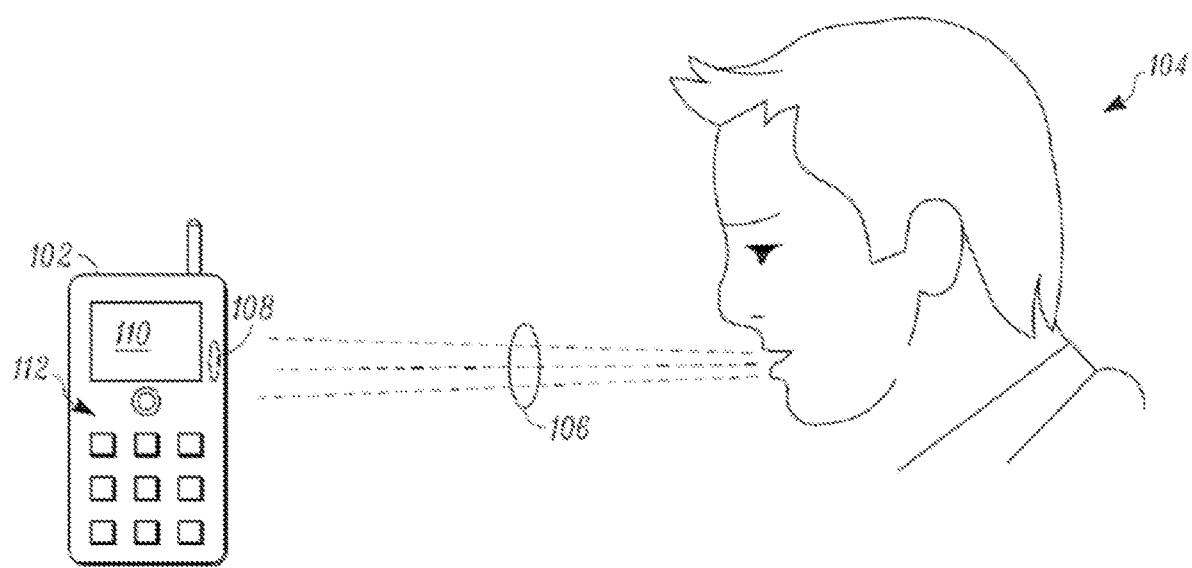
FIG. 1 shows a user speaking to an electronic device, which is depicted as a mobile device in the drawing.

FIGS. 3, 4A, 4B, 5, and 6 show steps that may be carried out according to various embodiments.

DESCRIPTION

The present disclosure sets forth a method and apparatus for noise variability estimation for efficient noise suppression and other applications.

In one embodiment, an electronic device receives an audio signal including speech and background noise. The device is able to measure the degree of variability in the background noise, i.e., whether the background noise exhibits a high degree of variability (e.g., babble noise) or a low degree of variability (e.g., car noise). Using the measured degree of variability, the device selects the appropriate pre-processing technique (e.g., noise suppression algorithm) to apply to the sampled audio signal (e.g., single microphone noise suppression, two microphone noise suppression, adaptive noise cancellation). In doing so, the device maximizes speech recognition performance.

According to an embodiment, an electronic device is able to measure noise variability of background noise present in an audio signal, and determine whether the measured noise variability is higher than a high threshold value or lower than a low threshold value. If the device determines that the noise variability is higher than the high threshold value, the device categorizes the background noise as having a high degree of variability. On the other hand, if the device determines that the noise variability is lower than the low threshold value, the device categorizes the background noise as having a low degree of variability. The electronic device stores the high threshold value, the low threshold value, a high boundary point, and a low boundary point in its memory. The high threshold value and the low threshold value are between the high boundary point and the low boundary point. The high boundary point is based on an analysis of a first data set including noises that exhibit a high degree of variability, and the low boundary point is based on an analysis of a second data set including noises that exhibit a low degree of variability.

In another embodiment, if the background noise is categorized as having a high degree of variability, the device suppresses the background noise using a first noise suppression algorithm. If the background noise is categorized as having a low degree of variability, the device suppresses the background noise using a second noise suppression algorithm. After the background noise is suppressed, the device may be controlled to perform a function designated by speech included in the audio signal.

In yet another embodiment, if the electronic device determines that the noise variability is between the low threshold value and the high threshold value, the electronic device further categorizes the background noise as having a degree of variability of a previous update or frame.

According to an embodiment, the electronic device determines whether a frame including the background noise is a noise update frame. If the frame is not a noise update frame, the device categorizes the background noise as having a degree of variability of a previous update or frame. If the frame is a noise update frame, the device further determines whether the frame is part of a sequence of contiguous noise update frames. If the frame is not part of a sequence of contiguous noise update frames, the device then categorizes the background noise as having a degree of variability of a previous update or frame.

In another embodiment, if the frame is part of a sequence of contiguous noise update frames, the electronic device further determines a maximum value of smoothed channel noise and a minimum value of smoothed channel noise in the sequence of contiguous noise update frames, and computes a smoothed maximum dB difference using the maximum value of smoothed channel noise and the minimum value of smoothed channel noise. Then, the device calculates the noise variability of the background noise using a ratio of a difference between the smoothed maximum dB difference and the low boundary point to a difference between the high boundary point and the low boundary point.

Optionally, the electronic device may smooth the calculated noise variability, and quantize the smoothed noise variability to at least two levels. The device may also bound the smoothed noise variability to an interval between 0 and 1 inclusive of 0 and 1 before quantizing the smoothed noise variability.

According to an embodiment, the electronic device is able to calculate the measure of noise variability of the background noise using the following equation:

$$MNV = \frac{1}{NC \times nb} \sum_{k=1}^{NC} \sum_{l=1}^{nb} \frac{(D\_smooth(k, l) - D\_smooth\_low(k, l))}{(D\_smooth\_high(k, l) - D\_smooth\_low(k, l))},$$

where MNV denotes the measure of noise variability of the background noise, NC denotes a number of channels, nb denotes a number of available, contiguous past noise update frames which are also contiguous with the current noise update frame (nb is the look-back depth in frames), k denotes a channel index, l denotes a look-back index, D_smooth(k, l) denotes a smoothed maximum dB difference of smoothed channel noise, D_smooth_high(k, l) denotes the high boundary point, and D_smooth_low (k, l) denotes the low boundary point.

In cases where the background noise has a low noise level (i.e., the background is less perceptible), it is preferable that the noise variability of the background noise be categorized as having a low degree of variability. Accordingly, in an embodiment, when the electronic device measures the noise variability of background noise present, the device further measures the noise level of the background noise and determines whether the measured noise level of the background noise is lower than a noise level threshold value. If the noise level of the background noise is determined to be lower than the noise level threshold value, the device calculates a bias energy value and adds the bias energy value to smoothed channel noise to generate modified smoothed channel noise. Then, the device uses the modified smoothed channel noise to measure the noise variability of the background noise. Note that it is beneficial to use the same bias energy value to generate the modified smoothed channel noise for all the frames in the contiguous sequence of noise update frames, which are used to determine MNV at the current frame. In one embodiment, the bias energy value may be based on the noise level of the background noise corresponding to the first frame in a given sequence of contiguous noise update frames.

It is also preferable to compensate for changes in frame energies so that the effect of such changes on the estimated measure of noise variability is mitigated. Accordingly, in an embodiment, when the electronic device measures the variability of background noise present, the frame energies of the contiguous noise update frames involved in the calculation of the MNV are also computed and used to compensate the smoothed channel noise values in such a way that the effect of changes in frame energies, e.g. an increasing or decreasing trend in energy, on the estimation of the MNV is mitigated.

The embodiments described herein are usable in the context of always-on audio (AOA). When using AOA, the device 102 (FIG. 1) is capable of waking up from a sleep mode upon receiving a trigger command from a user. AOA places additional demands on devices, especially mobile devices. AOA is most effective when the device 102 is able to recognize the user's voice commands accurately and quickly.

Referring to FIG. 1, a user 104 provides voice input (or vocalized information or speech) 106 that is received by a speech recognition-enabled electronic device ("device") 102 by way of a microphone (or other sound receiver) 108. The device 102, which is a mobile device in this example, includes a touch screen display 110 that is able to display visual images and to receive or sense touch type inputs as provided by way of a user's finger or other touch input device such as a stylus. Notwithstanding the presence of the touch screen display 110, in the embodiment shown in FIG. 1, the device 102 also has a number of discrete keys or buttons 112 that serve as input devices of the device. However, in other embodiments such keys or buttons (or any particular number of such keys or buttons) need not be present, and the touch screen display 110 can serve as the primary or only user input device.

Although FIG. 1 particularly shows the device 102 as including the touch screen display 110 and keys or buttons 112, these features are only intended to be examples of components/features on the device 102, and in other embodiments the device 102 need not include one or more of these features and/or can include other features in addition to or instead of these features.

The device 102 is intended to be representative of a variety of devices including, for example, cellular telephones, personal digital assistants (PDAs), smart phones, or other handheld or portable electronic devices. In alternate embodiments, the device can also be a headset (e.g., a Bluetooth headset), DVR player, battery-powered device, a watch device (e.g., a wristwatch) or other wearable device, radio, navigation device, laptop or notebook computer, netbook, pager, PMP (personal media player), DVR (digital video recorders), gaming device, camera, e-reader, e-book, tablet device, navigation device with video capable screen, multimedia docking station, or other device.

Embodiments of the present disclosure are intended to be applicable to any of a variety of electronic devices that are capable of or configured to receive voice input or other sound inputs that are indicative or representative of vocalized information.

Figure 2A:
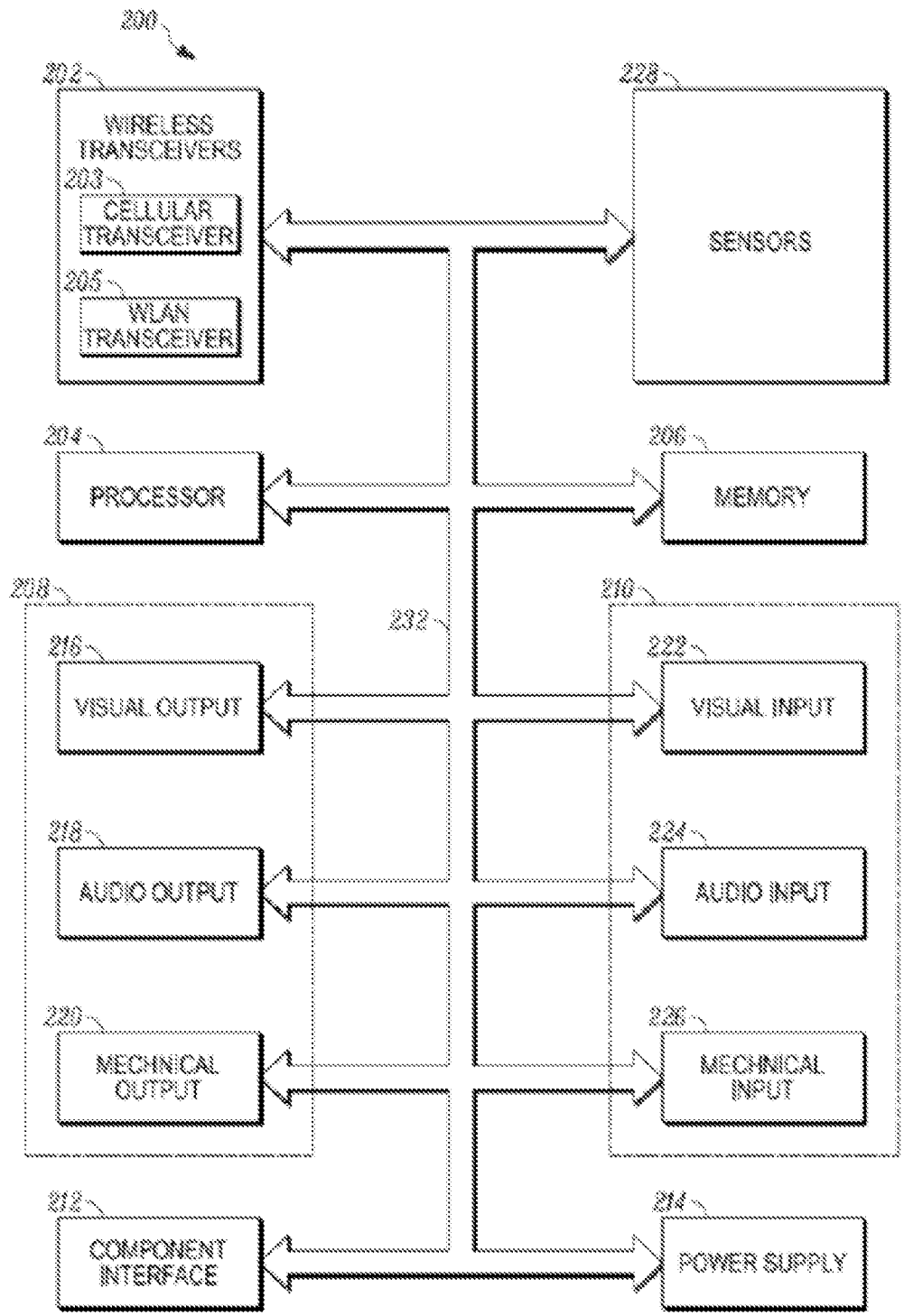
FIG. 2A shows example components of the electronic device of FIG. 1.

FIG. 2A shows internal components of the device 102 of FIG. 1, in accordance with an embodiment of the disclosure. As shown in FIG. 2A, the internal components 200 include one or more wireless transceivers 202, a processor 204 (e.g., a microprocessor, microcomputer, application-specific integrated circuit, etc.), a memory portion 206, one or more output devices 208, and one or more input devices 210. The internal components 200 can further include a component interface 212 to provide a direct connection to auxiliary components or accessories for additional or enhanced functionality. The internal components 200 may also include a power supply 214, such as a battery, for providing power to the other internal components while enabling the mobile device to be portable. Further, the internal components 200 additionally include one or more sensors 228. All of the internal components 200 can be coupled to one another, and in communication with one another, by way of one or more internal communication links 232 (e.g., an internal bus).

Further, in the embodiment of FIG. 2A, the wireless transceivers 202 particularly include a cellular transceiver 203 and a Wi-Fi transceiver 205. More particularly, the cellular transceiver 203 is configured to conduct cellular communications, such as 3G, 4G, 4G-LTE, vis-à-vis cell towers (not shown), albeit in other embodiments, the cellular transceiver 203 can be configured to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

By contrast, the Wi-Fi transceiver 205 is a wireless local area network (WLAN) transceiver 205 configured to conduct Wi-Fi communications in accordance with the IEEE 802.11 (a, b, g, or n) standard with access points. In other embodiments, the Wi-Fi transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology.

Although in the present embodiment the device 102 has two of the wireless transceivers 202 (that is, the transceivers 203 and 205), the present disclosure is intended to encompass numerous embodiments in which any arbitrary number of wireless transceivers employing any arbitrary number of communication technologies are present. By virtue of the use of the wireless transceivers 202, the device 102 is capable of communicating with any of a variety of other devices or systems (not shown) including, for example, other mobile devices, web servers, cell towers, access points, other remote devices, etc. Depending upon the embodiment or circumstance, wireless communication between the device 102 and any arbitrary number of other devices or systems can be achieved.

Operation of the wireless transceivers 202 in conjunction with others of the internal components 200 of the device 102 can take a variety of forms. For example, operation of the wireless transceivers 202 can proceed in a manner in which, upon reception of wireless signals, the internal components 200 detect communication signals and the transceivers 202 demodulate the communication signals to recover incoming information, such as voice and/or data, transmitted by the wireless signals. After receiving the incoming information from the transceivers 202, the processor 204 formats the incoming information for the one or more output devices 208. Likewise, for transmission of wireless signals, the processor 204 formats outgoing information, which can but need not be activated by the input devices 210, and conveys the outgoing information to one or more of the wireless transceivers 202 for modulation so as to provide modulated communication signals to be transmitted.

Depending upon the embodiment, the input and output devices 208, 210 of the internal components 200 can include a variety of visual, audio and/or mechanical outputs. For example, the output device(s) 208 can include one or more visual output devices 216 such as a liquid crystal display and/or light emitting diode indicator, one or more audio output devices 218 such as a speaker, alarm, and/or buzzer, and/or one or more mechanical output devices 220 such as a vibrating mechanism. The visual output devices 216 among other things can also include a video screen. Likewise, by example, the input device(s) 210 can include one or more visual input devices 222 such as an optical sensor (for example, a camera lens and photosensor), one or more audio input devices 224 such as the microphone 108 of FIG. 1 (or further for example a microphone of a Bluetooth headset), and/or one or more mechanical input devices 226 such as a flip sensor, keyboard, keypad, selection button, navigation cluster, touch pad, capacitive sensor, motion sensor, and/or switch. Operations that can actuate one or more of the input devices 210 can include not only the physical pressing/actuation of buttons or other actuators, but can also include, for example, opening the mobile device, unlocking the device, moving the device to actuate a motion, moving the device to actuate a location positioning system, and operating the device.

As mentioned above, the internal components 200 also can include one or more of various types of sensors 228 as well as a sensor hub to manage one or more functions of the sensors. The sensors 228 may include, for example, proximity sensors (e.g., a light detecting sensor, an ultrasound transceiver or an infrared transceiver), touch sensors, altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the device 102. Although the sensors 228 for the purposes of FIG. 2A are considered to be distinct from the input devices 210, in other embodiments it is possible that one or more of the input devices can also be considered to constitute one or more of the sensors (and vice-versa). Additionally, although in the present embodiment the input devices 210 are shown to be distinct from the output devices 208, it should be recognized that in some embodiments one or more devices serve both as input device(s) and output device(s). In particular, in the present embodiment in which the device 102 includes the touch screen display 110, the touch screen display can be considered to constitute both a visual output device and a mechanical input device (by contrast, the keys or buttons 112 are merely mechanical input devices).

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. In some embodiments, the memory portion 206 can be integrated with the processor 204 in a single device (e.g., a processing device including memory or processor-in-memory (PIM)), albeit such a single device will still typically have distinct portions/sections that perform the different processing and memory functions and that can be considered separate devices. In some alternate embodiments, the memory portion 206 of the device 102 can be supplemented or replaced by other memory portion(s) located elsewhere apart from the mobile device and, in such embodiments, the mobile device can be in communication with or access such other memory device(s) by way of any of various communications techniques, for example, wireless communications afforded by the wireless transceivers 202, or connections via the component interface 212.

The data that is stored by the memory portion 206 can include, but need not be limited to, operating systems, programs (applications), modules, and informational data. Each operating system includes executable code that controls basic functions of the device 102, such as interaction among the various components included among the internal components 200, communication with external devices via the wireless transceivers 202 and/or the component interface 212, and storage and retrieval of programs and data, to and from the memory portion 206. As for programs, each program includes executable code that utilizes an operating system to provide more specific functionality, such as file system service and handling of protected and unprotected data stored in the memory portion 206. Such programs can include, among other things, programming for enabling the device 102 to perform a process such as the process for speech recognition shown in FIG. 3 and discussed further below. Finally, with respect to informational data, this is non-executable code or information that can be referenced and/or manipulated by an operating system or program for performing functions of the device 102.

Figure 2B:
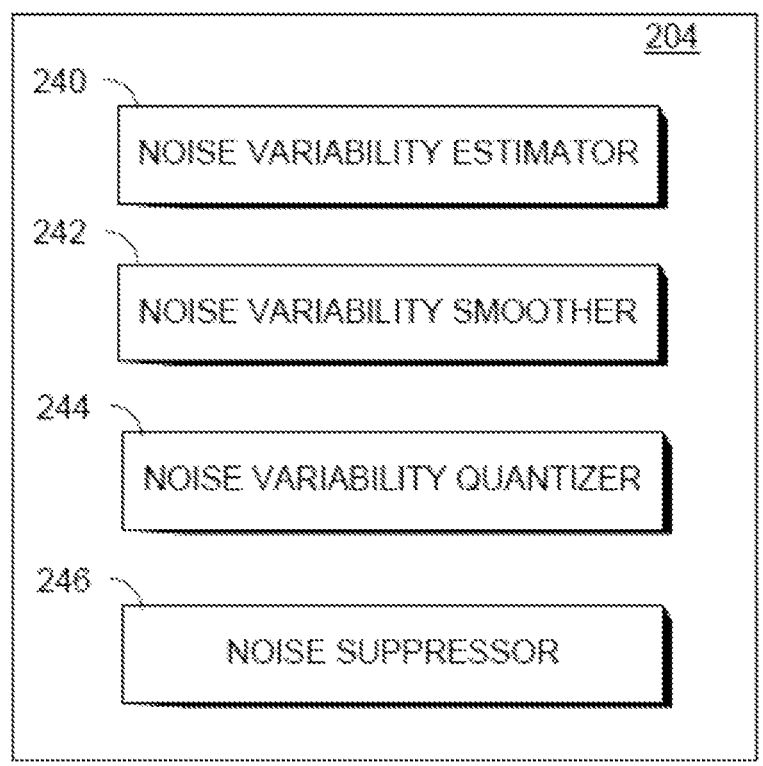
FIG. 2B shows example modules of the processor of FIG. 2A.

FIG. 2B shows example modules of the processor 204 of FIG. 2A, in accordance with an embodiment of the disclosure. As shown in FIG. 2B, the processor 204 includes a noise variability estimator 240, a noise variability smoother 242, a noise variability quantizer 244, and a noise suppressor 246. The noise variability estimator 240 measures noise variability of background noise present in an audio signal. The noise variability smoother 242 then smoothes the measure of noise variability received from the noise variability estimator 242. Next, the noise variability quantizer 244 optionally bounds the smoothed noise variability measurement within an interval and quantizes the bounded noise variability measurement to a finite number of levels, where each level represents a different degree of noise variability. In other words, the noise variability quantizer 244 categorizes the variability of the background noise according to the degree indicated by the finite number of levels. After the noise variability quantizer 244 categorizes the degree of variability of the background noise, the noise suppressor 246 selects the appropriate noise suppression algorithm and then suppresses the background noise using the selected noise suppression algorithm.

Figure 3:
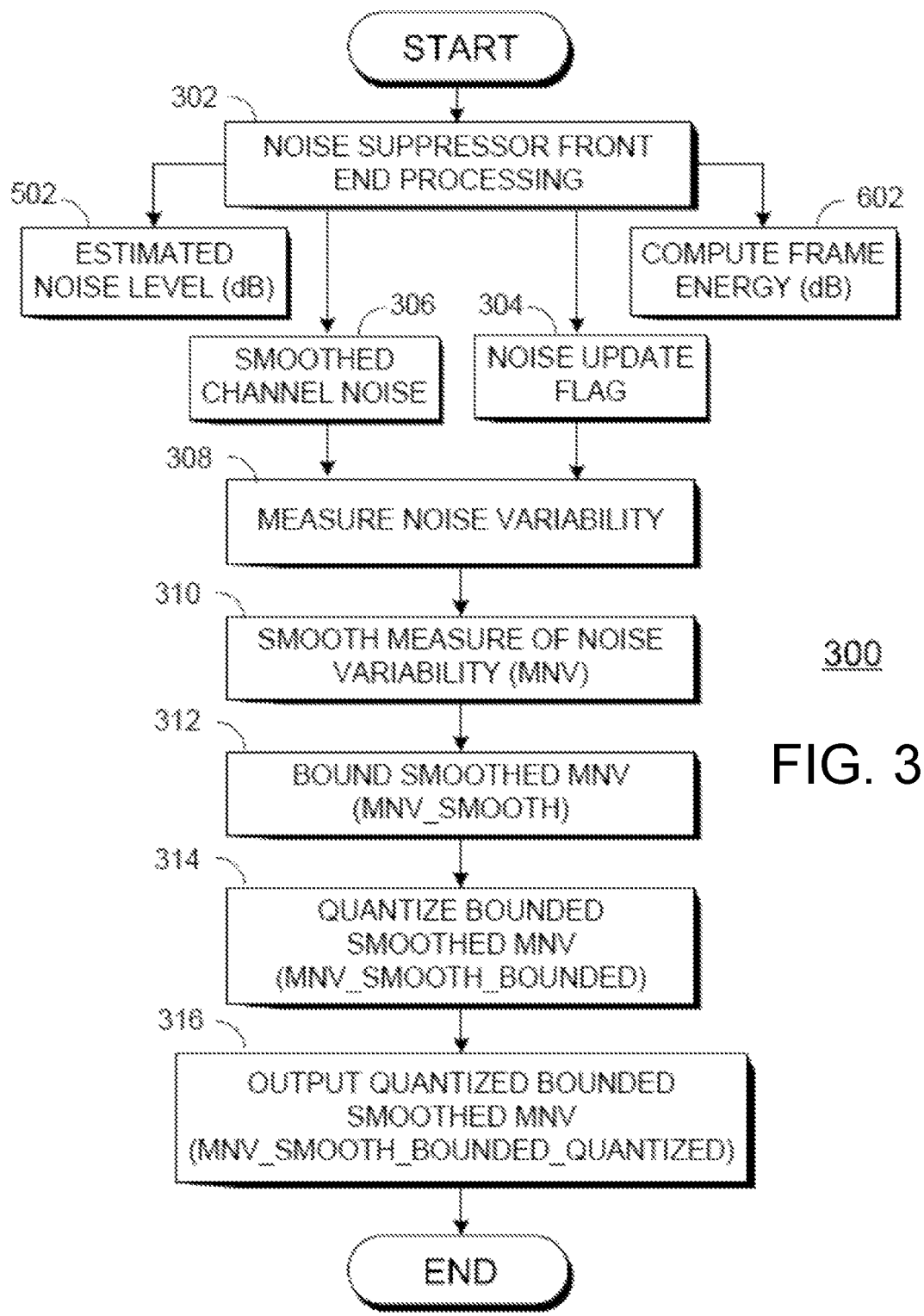

Referring to FIG. 3, a procedure 300 carried out by the electronic device 102 (FIG. 1) according to an embodiment will now be described. The procedure 300 starts with the electronic device 102 receiving an audio signal that includes both speech and background noise.

At step 302, the electronic device 102 performs front end processing on the background noise present in the sampled audio signal, where parameters being calculated in a noise suppressor (e.g., IS-127 Noise Suppressor) may be advantageously used. The IS-127 Noise Suppressor groups the input signal samples into frames (e.g., 10 ms frame length). The framed samples may be high-pass filtered to remove excess low frequency content which may be present (e.g., due to wind noise). Then, the IS-127 Noise Suppressor windows the data using a suitable analysis window with some overlap, and applies a Discrete Fourier Transform (DFT), or a fast implementation of the DFT (e.g., the Fast Fourier Transform (FFT)), to the windowed data to obtain a frequency domain (or equivalently, spectral domain) representation of the windowed data. In the wideband version of the IS-127 Noise Suppressor, operating at a sampling frequency (SF) of 16000 Hertz (Hz), the spectral data along the linear frequency axis are grouped into 21 channels, having non-uniform widths, with the individual channel widths selected to approximate the Bark Frequency scale, which seeks to more accurately reflect how sound is perceived by the human auditory system. The channel spectral data are used to make a decision on whether a given input frame is a noise update frame or not. The channel spectral data of the noise update frames are used to estimate the smoothed channel noise as described below.

At step 304, the device 102 sets the Noise Update Flag to 1 if the input frame is classified as a noise update frame. Otherwise, the device 102 sets the Noise Update Flag to 0. At step 306, when the Noise Update Flag is set to 1, the device 102 updates the smoothed channel noise in dB (CHN_dB) using the current frame's channel spectral data.

Optionally, the device 102 may measure noise level (in dB) of the background noise. The estimated noise level (dB) may be used in step 502 (FIG. 5) to generate a bias energy value to add to the smoothed channel noise, when the noise level of the background noise is very low. The procedure for generating the bias energy value will be explained in detail with respect to FIG. 5. Optionally, the device 102 may also compute the frame energy (in dB) in step 602. The computed frame energies may be used to compensate the smoothed channel noise for changes in frames energies so as to mitigate the effect of such changes on the estimated measure of noise variability as will be described in detail with respect to FIG. 6.

At step 308, the device 102 measures the noise variability of the background noise. For example, if a wideband version of IS-127 Noise Suppressor is used to calculate and provide the Noise Update Flag (NUF) and the smoothed channel noise (CHN_dB), up to 21 channels of smoothed noise estimates are available for each frame. Define NC, the number of channels, to be 21. At a given frame, the device 102 checks if that frame is a noise update frame (NUF=1). If the frame is a noise update frame, the device 102 further checks if the current frame is part of a sequence of contiguous noise update frames. Up to a maximum of NB previous contiguous frames, which are also contiguous with the current frame, are utilized by the device 102 to measure the noise variability of the background noise. The actual number of past frames nb in the sequence may thus vary between 1 and NB, where NB corresponds to a maximum look-back depth (i.e., maximum number of past frames). In the preferred embodiment, NB was selected as 10, which given 10 ms frame length, corresponds to a maximum look-back depth of 100 ms. For each of the nb+1 frames, in the sequence of contiguous noise update frames (with the additional one frame being the current input frame), the corresponding smoothed channel noise vector, in dB, CHN_dB is buffered, and available for analysis.

Next, the device 102 populates a matrix D(k, l), where k is a channel index ($1<=k<=NC$) and/is a look-back index ($1<=l<=nb$). For a given channel indexed by k and a look-back depth indexed by l, a maximum value (Vmax_k_l) and a minimum value (Vmin_k_l) of smoothed channel noise (CHN_dB) are found, within the look-back interval ($1<=n<=l$). From Vmax_k_l and Vmin_k_l, the device 102 computes the maximum dB difference and stores the difference in matrix D(k, l):

$$D(k,l)=Vmax\_k\_l-Vmin\_k\_l, (1<=k<=NC, 1<=l<=nb).$$

Thus, matrix D(k, l) contains the maximum dB difference in channel noise energy for channels indexed by k, within the look-back interval indexed by l, corresponding to the current frame, when the current frame is a noise update frame and is part of contiguous sequence of frames, where each frame in the sequence is classified as noise update frame.

Next, the device 102 smoothes the matrix D(k, l) so that the matrix D(k, l) approximates a long-term mean value of the maximum dB deviation for a given k and l, instead of a dB deviation corresponding to a given frame:

$$D\_smooth(k,l)=Alpha\_d*D(k,l)+(1-Alpha\_d)*D\_smooth(k,l),$$

$$1<=k<=NC, 1<=l<=nb$$

In the present embodiment, Alpha_d may be set to 0.01, although other values may be used.

Using the approximation of the long-term mean value of the maximum dB deviation (D_smooth(k, l)), the device 102 calculates the measure of noise variability of the background noise, MNV:

$$MNV = \frac{1}{NC \times nb} \sum_{k=1}^{NC} \sum_{l=1}^{nb} \frac{(D\_smooth(k, l) - D\_smooth\_low(k, l))}{(D\_smooth\_high(k, l) - D\_smooth\_low(k, l))},$$

where D_smooth_high(k, l) denotes the high boundary point and D_smooth_low (k, l) denotes the low boundary point for a given k and l. D_smooth_high(k, l) and D_smooth_low (k, l) are determined offline, and the procedure for determining D_smooth_high(k, l) and D_smooth_low (k, l) will be described in more detail with respect to FIG. 4B.

The measure of noise variability of the background noise (MNV) is a mean of (NC*nb) observations, with each observation indicating where the current frame's D_smooth (k, l) value falls relative to the two reference bounds D_smooth_high(k, l) and D_smooth_low(k, l). For a given (k, l) index pair, the D_smooth(k, l) may fall below the low boundary point D_smooth_low(k, l) (resulting in a negative contribution to MNV for that index pair), or it may be higher than the high boundary point D_smooth_high(k, l) (resulting in a contribution to MNV that is greater than one for that index pair).

At step 310, the device 102 smoothes the measured noise variability (MNV) of the background noise. Then at step 312, the device 102 bounds the smoothed MNV to an interval between 0 and 1 inclusive of 0 and 1:

```
if (MNV_smooth > 1 )
    MNV_smooth_bounded = 1;
else if (MNV_smooth < 0 )
    MNV_smooth_bounded = 0;
else
    MNV_smooth_bounded = MNV_smooth.
```

At step 314, the device 102 quantizes the bounded smoothed MNV (MNV_smooth_bounded_quantized) to a finite number of levels, e.g., two levels. If MNV_smooth_bounded_quantized rises above a high threshold THRESH_HI, it is set to 1 indicating that the background noise exhibits a high degree of variability. If MNV_smooth_bounded_quantized falls below a low threshold THRESH_LO, it is set to 0 indicating that the background noise is characterized by a low degree of variability.

In the present embodiment, the high threshold THRESH_HI may be set to 0.6, and the low threshold THRESH_LO may be set to 0.4, although other values may be selected. The threshold values THRESH_HI and THRESH_LO are selected as a function of the high boundary point D_smooth_high(k, l) and the low boundary point D_smooth_low (k, l). The threshold values THRESH_HI and THRESH_LO may be selected by the device 102 or may be preset offline.

Although FIG. 3 illustrates the bounding step 312 and the quantization step 314 as separate steps, the bounding step 312 may be performed as a part of the quantization step. Alternatively, the bounding step 312 may be omitted entirely, where the device 102 quantizes, if quantization is used, the noise variability in step 316 directly after it smoothes the measured noise variability in step 312.

Then at step 316, the device 102 outputs the quantized bounded smoothed MNV. Based on MNV_smooth_bounded_quantized, the device 102 selects the appropriate pre-processing technique (e.g., noise suppression algorithm) to apply to the sampled audio signal (e.g., single microphone noise suppression, two microphone noise suppression, adaptive noise cancellation). For example, the device 102 may suppress the background noise using a first noise suppression algorithm (i.e., a first pre-processing technique), if the background noise is categorized as having a high degree of variability (MNV_smooth_bounded_quantized=1). Alternatively, the device suppresses the background noise using a second noise suppression algorithm (i.e., a second pre-processing technique), if the background noise is categorized as having a low degree of variability (MNV_smooth_bounded_quantized=0). Generally, background noise exhibiting high variability requires a more complex noise suppression algorithm than background noise exhibiting low variability. After the background noise is suppressed, the device 102 may be controlled to perform a function designated by speech included in the audio signal.

Additionally, some hysteresis may be applied to reduce the number of state transitions in the quantized value of the parameter MNV_smooth_bounded. For example, state switching may be allowed only if MNV_smooth_bounded_quantized has been in a particular state for a minimum of N_COUNT frames (e.g., N_COUNT=200). In this case, the device 102 updates and outputs MNV_smooth_bounded_quantized only when N_COUNT has been reached. Otherwise, the device 102 outputs MNV_smooth_bounded_quantized from a previous update.

Furthermore, for the input signal frames that do not meet the criterion described above for updating the MNV value (i.e., if NUF=0 or the current frame is not part of a sequence of contiguous noise update frames), the device 102 may output the MNV value from the last update.

In other embodiments, a subset of the NC channels may be used for the computation of MNV, and, likewise, a subset of available look-back indices, 1<=l<=nb, may be selected for updating the MNV. Moreover, the quantization of MNV_smooth_bounded may be finer, i.e., more than two levels, with each level indicating the degree of variability in the noise signal.

Figure 4A:
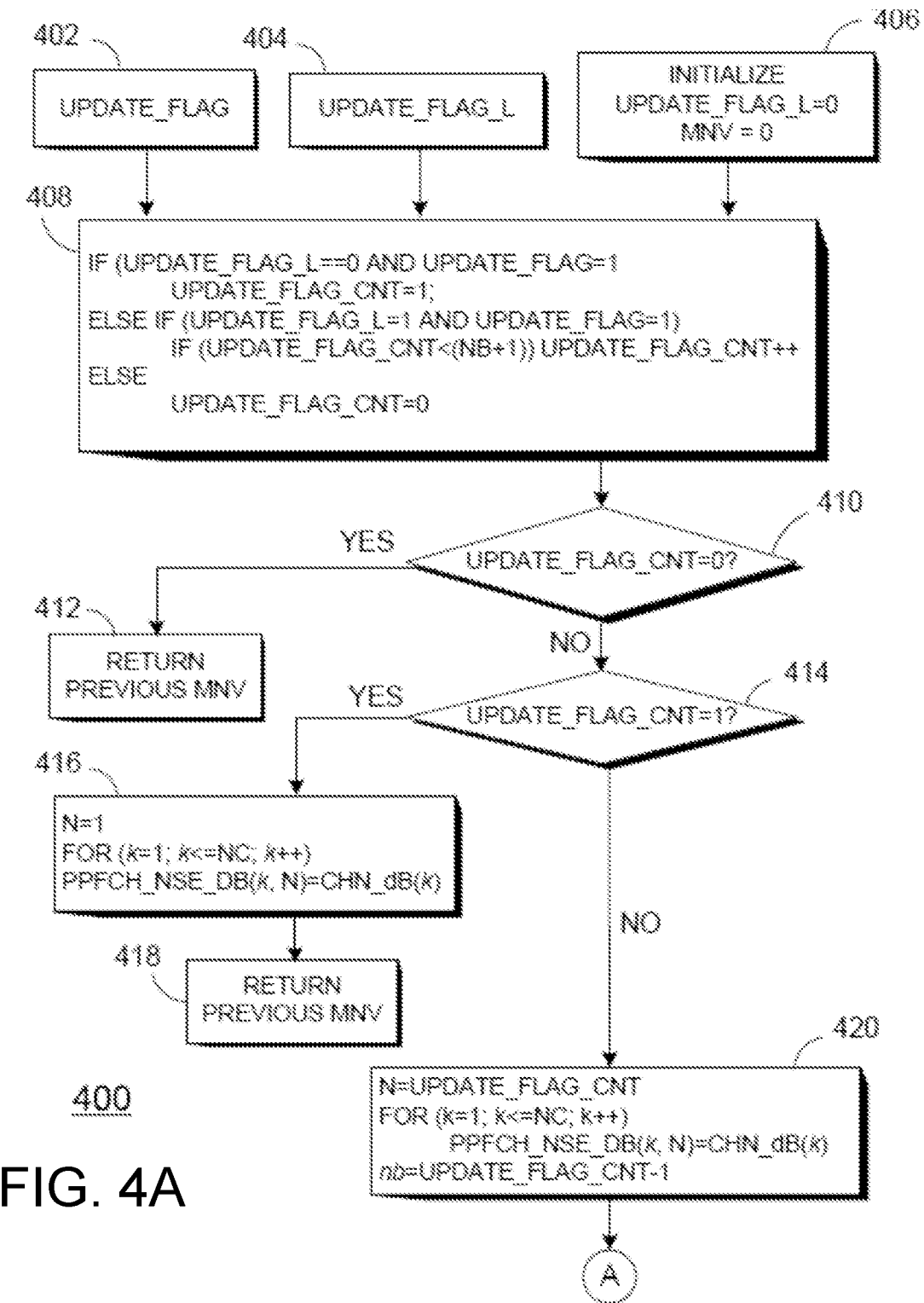
Figure 4B:
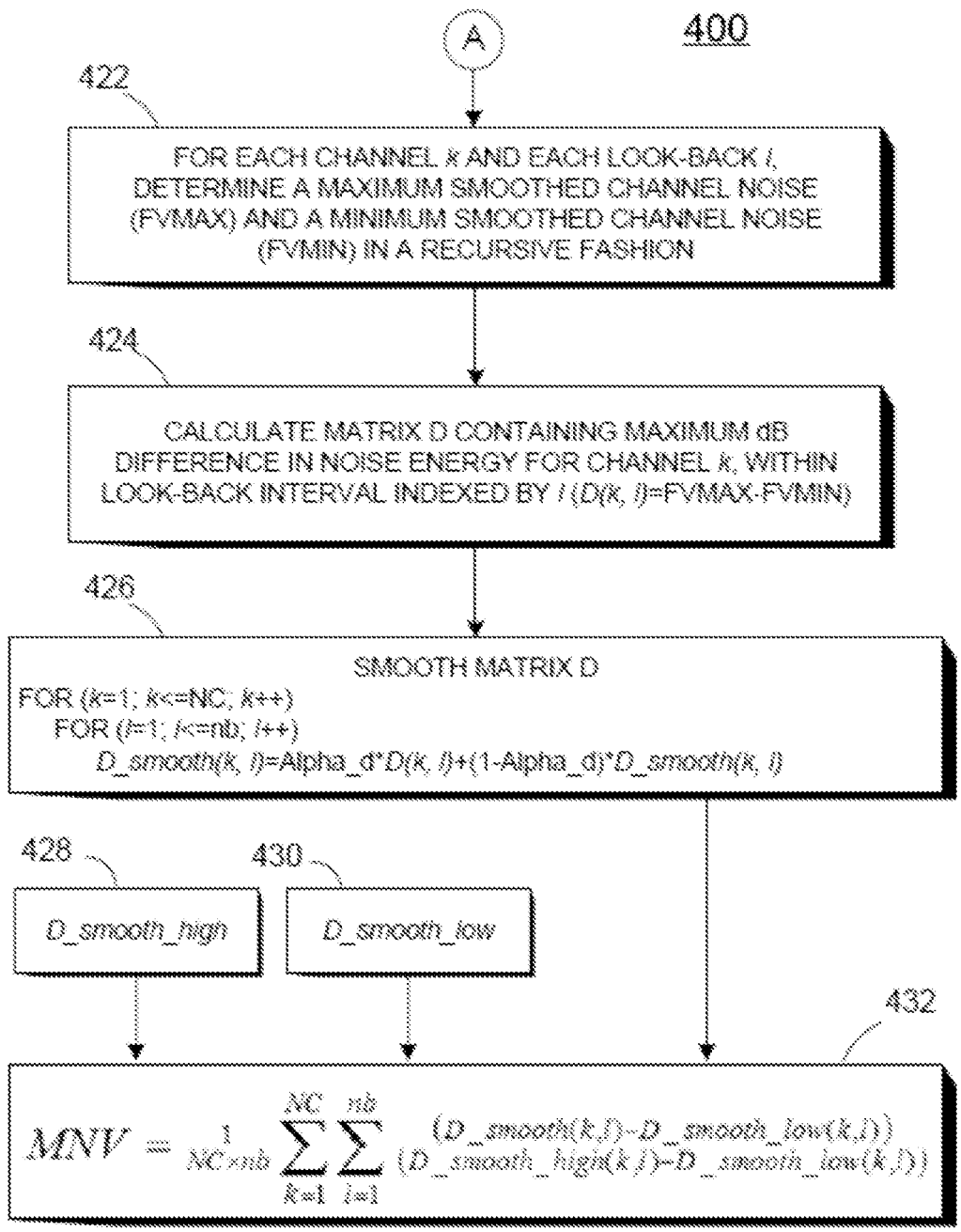

Referring to FIGS. 4A and 4B, a procedure 400 of measuring noise variability of background noise carried out by the electronic device 102 (FIG. 1) according to another embodiment will now be described. The procedure 400 is a detailed description of step 308 in FIG. 3.

Referring to FIG. 4A, at step 402, the device 102 uses the noise update flag of a current frame (UPDATE_FLAG) as an input. At step 404, the device 102 uses the noise update flag of the frame prior to the current frame (UPDATE_FLAG_L) as an input. At step 406, the device 102 initializes the noise update flag of the previous frame to 0 (UPDATE_FLAG_L=0) and sets the measured noise variability of the background noise as 0 (MNV=0).

At step 408, the device 102 determines whether the current frame is a noise update frame and whether the current frame is part of a sequence of contiguous noise update frames. If the previous frame is not a noise update frame (UPDATE_FLAG_L==0) and the current frame is a noise update frame (UPDATE_FLAG=1), then the device 102 sets the number of contiguous noise update frames to 1

(UPDATE_FLAG_CNT=1). In this case, the current frame may be the first frame a sequence of contiguous noise update frames.

If the previous frame is a noise update frame (UPDATE_FLAG_L=1) and the current frame is also a noise update frame (UPDATE_FLAG=1), then both the previous frame and the current frame are part of the sequence of contiguous noise update frames. The device 102 determines whether the number of past frames in the sequence of contiguous noise update frames, which sequence includes the past frame(s) and the current frame, has reached a maximum number NB of past noise update frames. If the number of frames in the sequence of contiguous noise update frames has not reached the maximum number NB+1 (UPDATE_FLAG_CNT<(NB+1)), then the number of frames in the sequence is incremented (UPDATE_FLAG_CNT++).

If the current frame is not a noise update frame (UPDATE_FLAG=0), then the number of frames in the sequence is set to 0 (UPDATE_FLAG_CNT=0).

At step 410, the device 102 determines whether the number of frames in the sequence of contiguous noise update frames is 0. If the number of frames is 0, the device 102 returns the measured noise variability of the last update (previous MNV) at step 412.

If the number of frames in the sequence of contiguous noise update frames is not 0, then at step 414, the device 102 determines whether the number of frames is 1 (i.e., only the current frame is a noise update frame). If the number of frames is 1 (UPDATE_FLAG_CNT=1), at step 416, the device 102 buffers the channel noise energies (in dB) for NC number of channels for the current frame (the number of channels being indexed by k).

Then at step 418, the device 102 returns the measure of noise variability of the last update (previous MNV). When the number of frames is 1, the current frame may be the first frame of a sequence of contiguous noise update frames (i.e., if the next frame is also a noise update frame). However, the current frame may not necessarily be part of a sequence of contiguous noise update frames (i.e., if the next frame is not a noise update frame).

If the number of frames in the sequence of contiguous noise update frames is greater than 1 (i.e., the current frame is part of the sequence of contiguous frames and there are at least two frames in the sequence), at step 420, the device 102 buffers the channel noise energies (in dB) for NC number of channels of the current frame (the channels being indexed by k), in addition to the channel noise energies (in dB) of the previous frames in the sequence that are already buffered (i.e., with the buffer containing up to NB+1 frames). In doing so, for each frame in the sequence of contiguous noise update frames (which includes the past frame(s), in addition to the current input frame), the corresponding smoothed channel noise vector is buffered and available for analysis. Then, the device 102 sets the number of previous frames nb to UPDATE_FLAG_CNT−1.

Referring to FIG. 4B, at step 422, for each channel k within the look-back interval nb indexed by l, the device 102 determines a maximum value of smoothed channel noise (FVMAX) and a minimum value of smoothed channel noise (FVMIN), in the dB domain, in a recursive fashion. Then in step 424, the device 102 calculates matrix D(k, l) containing maximum dB difference in noise energy for channel k, within the look-back interval nb indexed by l (D(k, l)=FVMAX−FVMIN). The device 102 may perform steps 422 and 424 as follows:

```
N = UPDATE_FLAG_CNT
For (k=1; k<=NC; k++)
    FVMAX=PPFCH_NSE_DB(k, N)
    FVMIN=FVMAX
    For (l=1; l<=nb; l++)
        If (PPFCH_NSE_DB(k, N−l)>FVMAX)
            FVMAX=PPFCH_NSE_DB(k, N−l)
        If (PPFCH_NSE_DB(k, N−l)<FVMIN )
            FVMIN=PPFCH_NSE_DB(k, N−l)
        D(k, l)=FVMAX−FVMIN.
```

Note that matrix PPFCH_NSE_DB(k, N), for k=[1, NC], at index N=UPDATE_FLAG_CNT contains the buffered smoothed channel noise, in dB, for the current frame, and the buffered smoothed channel noise, in dB, for each of the nb preceding frames, in a contiguous sequence of noise update frames, for look-back intervals up to nb past frames (i.e., N−nb=1). If nb at the previous frame had the maximum value (nb=NB), and the current frame is a noise update frame (NUF=1), nb at the current frame will be limited to NB. This means that prior to writing the smoothed channel noise, in dB, for the current frame into the buffer, the contents of the buffer need to be shifted down by one frame, to make room for the current frame's information; i.e., $$PPFCH\_NSE\_DB(k,l)=PPFCH\_NSE\_DB(k,l+1), k=[1,NC], l=[1,NB].$$

Alternately, a circular buffer, as known in the art, could be employed to eliminate the explicit shifting down of the buffer contents, while maintaining identical functionality.

At step 426, the device 102 smoothes the matrix D(k, l) to obtain D_smooth(k, l):

For (k=1; k<=NC; k++)
  For (l=1; l<=nb; l++)

$$D\_smooth(k,l)=Alpha\_d*D(k,l)+(1-Alpha\_d)*D\_smooth(k,l).$$

Offline, at steps 428 and 430, a high boundary point D_smooth_high(k, l) and a low boundary point D_smooth_low(k, l) are respectively determined. When determining the boundary points, steps 428 to 430 are used to processes two types of speech plus noise signals: (1) speech plus noise exhibiting a high degree of variability and (2) speech plus noise exhibiting a low degree of variability. Alternatively, noise-only signals can also be used for steps 428 and 430 instead of or in addition to speech plus noise signals. For example, babble noise may be used as noise exhibiting a high degree of spectral variability with respect to time, while car noise may be used as noise exhibiting a low degree of variability.

The two types of speech plus noise files used in steps 428 and 430 are analyzed offline to provide calibrated boundary values (or references or anchors) for categorizing the degree of variability of the background noise: one for an upper bound of expected noise variability (speech plus noise exhibiting a high degree of variability), and the other for the lower bound (speech plus noise exhibiting a low degree of variability). This analysis results in two boundary points of the D_smooth(k, l) matrix:

$$D\_smooth\_high(k,l), 1<=k<=NC, 1<=l<=NB$$

$$D\_smooth\_low(k,l), 1<=k<=NC, 1<=l<=NB$$

When populating the D_smooth_high(k, l) and D_smooth_low(k, l) matrices offline, there is an additional processing step, not present in the real-time version of the procedure. For each of the two input reference databases used in the analysis, the respective D_smooth(k, l) matrix is stored for each frame; i.e., D_smooth (k, l, i), where i is a frame index. To determine D_smooth_high(k, l) for each (k, l) index pair, a mean value of D_smooth (k, l, i), over selected frames indexed by i, is calculated and stored in D_smooth_high(k, l), and similarly for D_smooth_low(k, l). A subset of available frames is used to compute the mean values, where for a frame to be selected as a member of the subset, the frame had to meet the following criteria: it is classified as a noise update frame (NUF=1), and is part of a sequence of contiguous noise update frames.

Having established the two boundary points as described above, it becomes feasible to compute a measure of noise variability defined continuously between 0 and 1 (inclusive), where a value close to 0 indicates that the background noise has a low degree of variability (e.g. car noise), while a value close to 1 indicates that the background noise has a high degree of variability (e.g. babble noise).

At step 432, the device 102 then uses D_smooth(k, l), D_smooth_high(k, l) and D_smooth_low (k, l), to compute the measure of noise variability of the background noise, MNV:

$$MNV = \frac{1}{NC \times nb} \sum_{k=1}^{NC} \sum_{l=1}^{nb} \frac{(D\_smooth(k, l) - D\_smooth\_low(k, l))}{(D\_smooth\_high(k, l) - D\_smooth\_low(k, l))}$$

In FIGS. 3, 4A, and 4B, the high threshold value THRESH_HI, the low threshold value THRESH_LO, the high boundary point D_smooth_high(k, l), and the low boundary point D_smooth_low(k, l) may be stored in the memory portion 206 (FIG. 2A) of the device 102.

Figure 5:
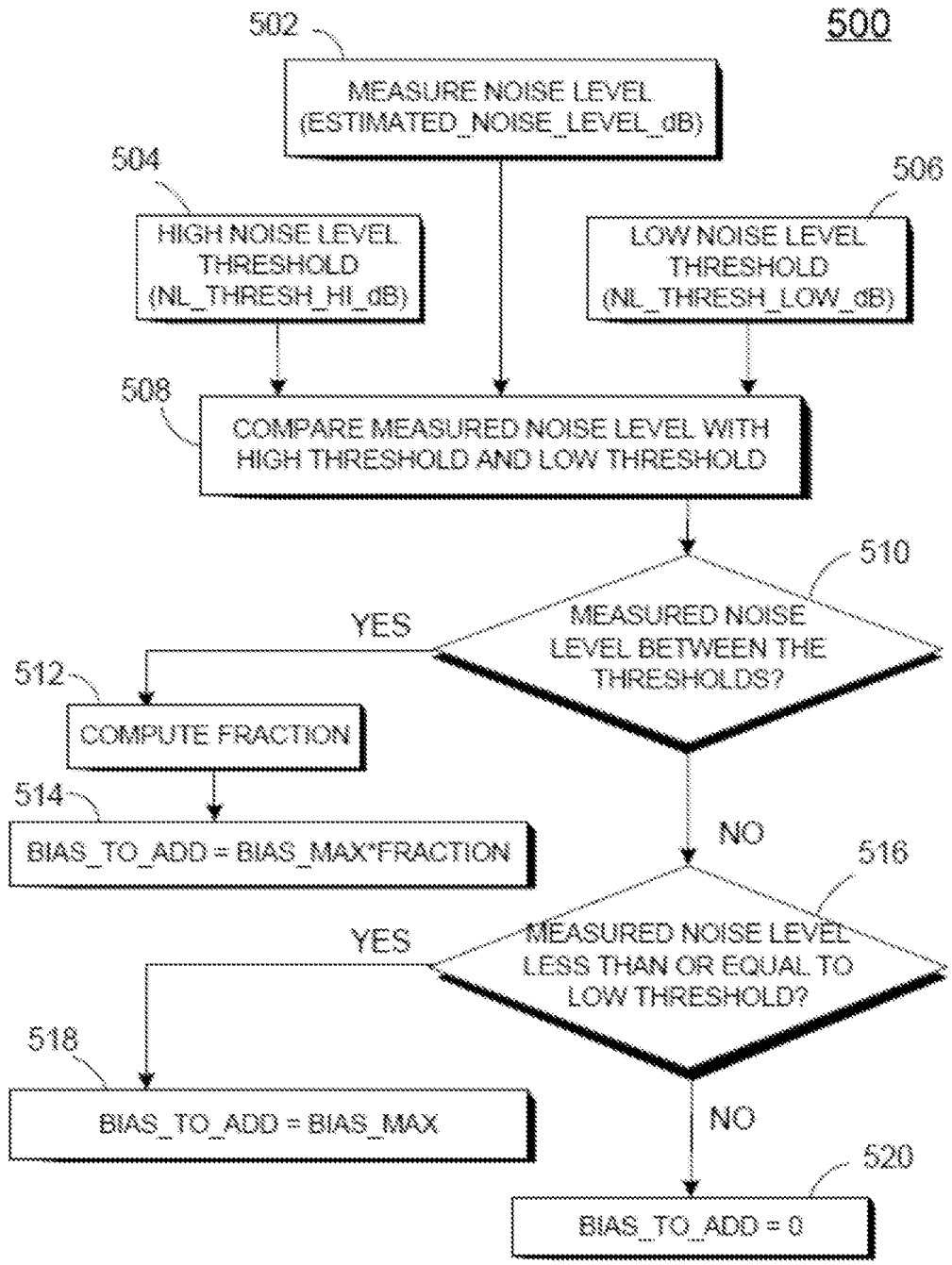

Referring to FIG. 5, another procedure 500 carried out by the electronic device 102 according to an embodiment will now be described. The procedure 500 deals with the case when the noise level of the background noise is very low. In such case, the noise variability of the background noise is not well defined, and the noise variability may be detected as being high causing the device to select a noise suppression algorithm more complex than necessary. Because the background noise is less perceptible, the low noise level of background noise makes the characteristics of the noise less important. In this case, it is preferable that the background noise be categorized as having very low variability, so that the device can select a simpler noise suppression algorithm that requires less processing power.

To address the above issue, the device 102 performs the procedure 500 as a pre-processing step to measuring the noise variability of the background noise (e.g., procedures 300 and 400). In this embodiment, before the variability of the background noise is measured and categorized, the device 102 measures the noise level of the background noise and determines an energy bias value that may be added to the channel noise energy array (i.e., smoothed channel noise energy). Then, the energy bias value is added to the channel noise energy array prior to converting the channel noise array from the energy domain to the dB domain. Note that it is beneficial to use the same bias energy value to generate modified smoothed channel noise, for all the frames in the contiguous sequence of noise update frames, which are used to determine MNV at the current frame. In one embodiment, the bias energy value may be based on the noise level of the background noise corresponding to the first frame in a given sequence of contiguous noise update frames.

In more detail, at step 502, the device 102 measures the noise level of the background noise (Estimated Noise Level dB). In steps 504 and 506, the device 102 uses a high noise level threshold (NL_Thresh_Hi_dB) and a low noise level threshold (NL_Thresh_Lo_dB) as input. The high noise level threshold (NL_Thresh_Hi_dB) and the low noise level threshold (NL_Thresh_Lo_dB) may be set by the device 102 and stored in the memory portion 206 of the device 102.

At step 508, the device 102 compares the measured noise level of the background noise with the high noise level threshold and the low noise level threshold. At step 510, the device 102 determines whether the measured noise level of the background noise falls between the two thresholds. If the measured noise level falls between the two thresholds, at step 512, the device 102 computes a Fraction, where $$Fraction = 1 - \frac{Estimated\_Noise\_Level\_dB - NL\_Thresh\_Lo\_dB}{NL\_Thresh\_Hi\_dB - Estimated\_Noise\_Level\_dB}.$$

Then at step 514, the device determines that the energy bias value to be added is Bias_Max*Fraction.

If the measured noise does not fall between the two thresholds, then at step 516, the device 102 determines whether the measured noise level of the background noise is less than or equal to the low threshold. If the measured noise level is less than or equal to the low threshold, then the energy bias value is set to Bias_Max (a maximum value of the energy bias to add) at step 518. On the other hand, if the measured noise level is greater than the low threshold, the energy bias value is set to 0 at step 520.

Steps 508 to 520 may be expressed as follows:

```
If (Estimated_Noise_Level_dB > NL_Thresh_Lo_dB &&
   Estimated_Noise_Level_dB < NL_Thresh_Hi_dB)
```

$$Fraction = 1 - \frac{Estimated\_Noise\_Level\_dB - NL\_Thresh\_Lo\_dB}{NL\_Thresh\_Hi\_dB - Estimated\_Noise\_Level\_dB};$$

```
   Bias_to_add = Bias_Max*Fraction;
else if (Estimated_Noise_Level_dB <= NL_Thresh_Lo_dB)
   Bias_to_add = Bias_Max;
else
   Bias_to_add = 0.
```

Note that it is beneficial to use the same value of Bias_to_add, for all the frames in a sequence of contiguous noise update frames. In the preferred embodiment, the Bias_to_add is only calculated and updated at the current frame, if the current frame is a noise update frame (i.e., NUF=1), and the preceding frame is not a noise update frame (i.e., NUF=0). An updated Bias_to_add value is used, if the energy bias energy value has been updated at the current frame; otherwise an energy bias value from the last time that value has been updated is used instead.

The thus modified channel noise energy array is then converted to dB, and the device 102 uses the modified channel noise energy array as an input when measuring the variability of the background noise. This modification according to procedure 500 ensures that when low level of background noise is present, the device 102 categorizes the background noise as having a low level of noise variability. In the present embodiment, NL_Thresh_Lo_dB may be set at −55 dB and NL_Thresh_Hi_dB may be set at −45 dB. Bias_Max may be set at an energy domain value corresponding to −70 dB. Of course, appropriate values for the two noise level thresholds and the maximum energy bias to add (Bias_Max) are implementation dependent, and other values may be used in various other embodiments.

Figure 6:
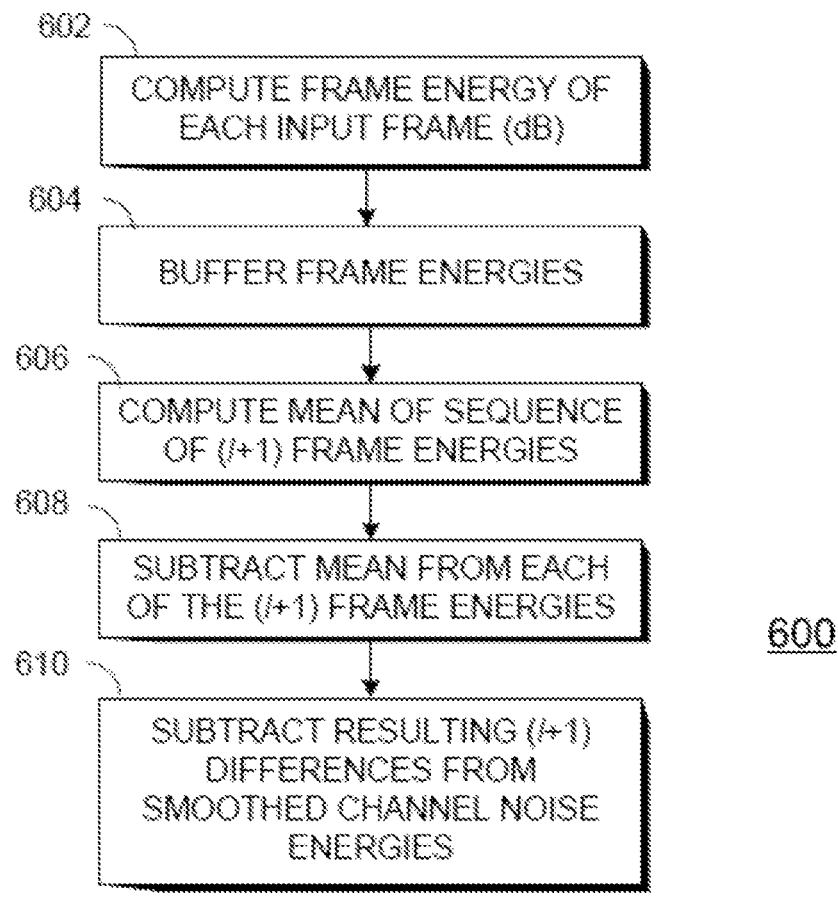

Referring to FIG. 6, another procedure 600 carried out by the electronic device 102 according to another embodiment will now be described. In this embodiment, the frame energies of the contiguous noise update frames involved in the calculation of the MNV are computed and used to compensate the smoothed channel noise energy values in such a way that the effect of changes in frame energies on the estimation of the MNV is mitigated. To do this, the device 102 computes the frame energy of each input frame (in dB) at step 602. At step 604, the device 102 buffers the frame energies corresponding to the contiguous sequence of noise update frames involved in the estimation of MNV in much the same way as channel noise energies are buffered. In computing the MNV, for each look-back interval l, 1<=l<=nb, the changes in frame energies are compensated for in the following manner. At steps 606 and 608, the device computes the mean of the sequence of (l+1) frame energies and subtracts the mean from each of the (l+1) frame energies. Then at step 610, the device 102 subtracts each of the resulting (l+1) differences from the smoothed channel noise energies of the corresponding frames before the smoothed channel noise energies are used in the estimation of the MNV. By using the compensated channel noise energies in the estimation of the MNV, any effect due to trends in noise update frame energies is mitigated.

While the embodiments have been described as using the wideband version of the IS-127 Noise Suppressor (operating at 16000 Hz sampling frequency) to provide the smoothed channel noise energies and the NUF as inputs, a standalone version of the processing blocks needed to compute the required inputs could be used instead, which need not be identical to the IS-127 Noise Suppressor. Also, sampling frequencies other than 16000 Hz and frame lengths other than the 10 ms of the preferred embodiment may be employed.

It can be seen from the foregoing that a method for apparatus for training a database for speech recognition has been provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. A computer-implemented method that when executed on data processing hardware causes the data processing hardware to perform operations comprising:
 receiving audio data;
 processing background noise included in the audio data to:
  obtain a smoothed channel noise energy associated with the background noise included in the audio data; and
  determine a noise level of the background noise included in the audio data;
 determining a predetermined bias energy value based on a magnitude of the noise level of the background noise;
 generating modified smoothed channel noise energy by adding the predetermined bias energy value to the smoothed channel noise energy;
 determining a degree of variability of the background noise included in the audio data based on the modified smoothed channel noise energy;
 based on the degree of variability of the background noise, selecting one of a first noise suppressor or a second noise suppressor to use for suppressing the background noise, the second noise suppressor requiring a greater amount of processing power than the first noise suppressor
 processing the audio data to suppress the background noise using the selected one of the first noise suppressor or the second noise suppressor; and
 performing speech recognition on the processed audio data to generate a transcription of speech included in the received audio data.

2. The computer-implemented method of claim 1, wherein the operations further comprise:
 determining whether the magnitude of the noise level of the background noise included in the audio data satisfies a noise level threshold,
 wherein generating the modified smoothed channel noise energy comprises generating the modified smoothed channel noise energy when the magnitude of the noise level of the background noise included in the audio data satisfies the noise level threshold.

3. The computer-implemented method of claim 2, wherein the magnitude of the noise level of the background noise included in the audio data satisfies the noise level threshold when the magnitude of the noise level of the background noise is less than the noise level threshold.

4. The computer-implemented method of claim 1, wherein selecting the one of the first noise suppressor or the second noise suppressor based on the degree of variability of the background noise comprises:
 selecting the first noise suppressor when the degree of variability of the background noise included in the audio data is less than a low threshold value; or
 selecting the second noise suppressor when the degree of variability of the background noise included in the audio data is greater than a high threshold value.

5. The computer-implemented method of claim 4, wherein, when the degree of variability of the background noise included in the audio data is between the low threshold value and the high threshold value, selecting the one of the first noise suppressor or the second noise suppressor that was used to suppress the background noise associated with a previous frame of the audio data.

6. The computer-implemented method of claim 1, wherein:
 the data processing hardware resides on a user computing device; and
 receiving audio data comprises receiving audio data captured by one or more microphones of the user computing device.

7. The computer-implemented method of claim 6, wherein the user computing device comprises a portable electronic device.

8. The computer-implemented method of claim 6, wherein the user computing device comprises a navigation device.

9. The computer-implemented method of claim 1, wherein the operations further comprise:
 determining that a respective portion of the audio data that includes the background noise is a noise update portion;
 based on determining that the respective portion of the audio data that includes the background noise is a noise update portion, determining that the respective portion is not part of a sequence of contiguous noise portions; and determining that the respective portion of the audio data has a degree of variability of a previous portion of the audio data.

10. The computer-implemented method of claim 1, wherein the operations further comprise:

determining that a respective portion of the audio data that includes the background noise is not a noise update portion; and based on determining that the respective portion of the audio data that includes the background noise is not a noise update portion, determining that the respective portion of the audio data has a degree of variability of a previous portion of the audio data.

11. A user computing device comprising:
data processing hardware; and
memory hardware in communication with the data processing hardware and storing instructions that when executed on the data processing hardware cause the data processing hardware to perform operations comprising:
receiving audio data;
processing background noise included in the audio data to:
obtain a smoothed channel noise energy associated with the background noise included in the audio data; and
determine a noise level of the background noise included in the audio data;
determining a predetermined bias energy value based on a magnitude of the noise level of the background noise;
generating modified smoothed channel noise energy by adding the predetermined bias energy value to the smoothed channel noise energy;
determining a degree of variability of the background noise included in the audio data based on the modified smoothed channel noise energy;
based on the degree of variability of the background noise, selecting one of a first noise suppressor or a second noise suppressor to use for suppressing the background noise, the second noise suppressor requiring a greater amount of processing power than the first noise suppressor
processing the audio data to suppress the background noise using the selected one of the first noise suppressor or the second noise suppressor; and
performing speech recognition on the processed audio data to generate a transcription of speech included in the received audio data.

12. The user computing device of claim 11, wherein the operations further comprise:
determining whether the magnitude of the noise level of the background noise included in the audio data satisfies a noise level threshold,
wherein generating the modified smoothed channel noise energy comprises generating the modified smoothed channel noise energy when the magnitude of the noise level of the background noise included in the audio data satisfies the noise level threshold.

13. The user computing device of claim 12, wherein the magnitude of the noise level of the background noise included in the audio data satisfies the noise level threshold when the magnitude of the noise level of the background noise is less than the noise level threshold.

14. The user computing device of claim 11, wherein selecting the one of the first noise suppressor or the second noise suppressor based on the degree of variability of the background noise comprises:
selecting the first noise suppressor when the degree of variability of the background noise included in the audio data is less than a low threshold value; or
selecting the second noise suppressor when the degree of variability of the background noise included in the audio data is greater than a high threshold value.

15. The user computing device of claim 14, wherein, when the degree of variability of the background noise included in the audio data is between the low threshold value and the high threshold value, selecting the one of the first noise suppressor or the second noise suppressor that was used to suppress the background noise associated with a previous frame of the audio data.

16. The user computing device of claim 11, wherein:
the data processing hardware resides on a user computing device; and
receiving audio data comprises receiving audio data captured by one or more microphones of the user computing device.

17. The user computing device of claim 16, wherein the user computing device comprises a portable electronic device.

18. The user computing device of claim 16, wherein the user computing device comprises a navigation device.

19. The user computing device of claim 11, wherein the operations further comprise:
determining that a respective portion of the audio data that includes the background noise is a noise update portion;
based on determining that the respective portion of the audio data that includes the background noise is a noise update portion, determining that the respective portion is not part of a sequence of contiguous noise portions; and
determining that the respective portion of the audio data has a degree of variability of a previous portion of the audio data.

20. The user computing device of claim 11, wherein the operations further comprise:
determining that a respective portion of the audio data that includes the background noise is not a noise update portion; and
based on determining that the respective portion of the audio data that includes the background noise is not a noise update portion, determining that the respective portion of the audio data has a degree of variability of a previous portion of the audio data.

* * * * *